United States Patent [19]

Chatelain

[11] 4,299,935
[45] Nov. 10, 1981

[54] PROCESS FOR BULK POLYMERIZATION

[75] Inventor: Jean Chatelain, Lyons, France

[73] Assignee: Rhone-Progil, Paris, France

[21] Appl. No.: 32,279

[22] Filed: Apr. 23, 1979

Related U.S. Application Data

[60] Continuation of Ser. No. 660,762, Feb. 23, 1976, abandoned, which is a continuation of Ser. No. 447,951, Mar. 4, 1974, abandoned, which is a division of Ser. No. 269,021, Jul. 5, 1972, abandoned.

[30] Foreign Application Priority Data

Jul. 8, 1971 [FR] France .................. 71 24990

[51] Int. Cl.³ ...................... C08F 2/02; C08F 14/06
[52] U.S. Cl. ........................... 526/88; 422/135; 526/344.1
[58] Field of Search ............ 526/64, 72, 88, 344.1, 526/345; 422/131, 135, 137, 138

[56] References Cited

U.S. PATENT DOCUMENTS

| | | | |
|---|---|---|---|
| 3,438,952 | 4/1969 | Christensen | 526/88 |
| 3,522,227 | 7/1970 | Thomas | 526/88 |
| 3,538,067 | 11/1970 | Bognar | 526/344.1 |
| 3,681,308 | 8/1972 | Irvin | 526/88 |
| 3,820,761 | 7/1974 | Rigal | 416/227 |
| 4,198,376 | 4/1980 | Fournel | 422/135 |

FOREIGN PATENT DOCUMENTS 1360251 3/1964 France .................. 526/344.1

Primary Examiner—C. A. Henderson
Attorney, Agent, or Firm—McDougall, Hersh & Scott

[57] ABSTRACT

The bulk polymerization of monomers which produce polymer insoluble in the monomers, in which the polymerization is carried out in an autoclave mounted on a horizontal axis and provided with stirring means formed of at least two half-frames arranged symmetrically of the axis of the autoclave and fixed at each end to a rotatable stub shaft axially mounted in the autoclave, each half-frame having a peripheral member serving as a blade which, on rotation of the half-frames, passes in close proximity to the interior surface of the autoclave, and bracing means interconnecting the peripheral members of the half-frames.

5 Claims, 2 Drawing Figures

PROCESS FOR BULK POLYMERIZATION

This application is a continuation of U.S. Application Ser. No. 660,762, filed Feb. 23, 1976 (now abandoned), which application was a continuation of U.S. Application Ser. No. 447,951, filed Mar. 4, 1974 (now abandoned), which application was a division of U.S. Application Ser. No. 269,021, filed July 5, 1972 (now abandoned).

The present invention relates to a process for the bulk polymerization, that is polymerization in the absence of any solvent, dilutant or dispersion agent, of monomers which produce polymers insoluble in the monomers from which they are derived, for example ethylene derivative monomers.

BACKGROUND OF THE INVENTION

The bulk polymerization of ethylene derivatives, and notably of vinyl chloride, presents a number of difficulties due largely to the fact that the reaction is exothermic and therefore it is necessary to provide effective means for the correct and regular removal of the heat released during the reaction to ensure uniform properties in the products obtained.

During bulk polymerization, it is found that the whole of the material undergoing polymerization very rapidly adopts a pulverulent form. For example, in the case of vinyl chloride, this pulverulent form is reached as soon as a mere 20% of the material is polymerized. This pulverulent form does not favor heat exchange and the correct and regular removal of the heat released during the reaction through the walls of the autoclave, which is generally used as the reaction vessel.

Stirring this pulverulent material, so as to bring it into contact with the walls of the autoclave, enables the heat of reaction to be removed with some degree of success. It is, however, difficult, with the current stirring or agitation means, to obtain a homogeneous dispersion of the solid particles of polymer in the vapor phase of the monomer. This irregular distribution of the polymer particles during growth, resulting from the polymerization of the adsorbed monomer which the particles contain, leads to the formation of aggregates which, at the end of the polymerization, frequently result in the polymer of a single batch having widely varying grain size, and may even result in crust formation.

Stirrers of the "ribbon blender" type have already been used. They comprise one or more helically wound strips fixed coaxially to a single rotatable shaft passing axially through the autoclave along its axis. This type of stirrer is based on the principle of a trough mixer in which two helically wound strips of "balanced opposed pitch" rotate. These two strips operate in the manner of a pump, one of the strips moving the material in one direction and the other in the opposite direction. When the pitches are balanced, there is no resultant transport of the material to either one end or the other of the trough. This is acceptable when the trough is filled and when the volume of material does not vary during the course of stirring or mixing. During polymerization, however, the density of the material varies and the portion of the stirrer which is immersed varies and it is found that transportation and accumulation of the material at one of the ends takes place, with the result that the stirring efficiency is reduced.

In my French Pat. No. 1,360,251, a stirrer of a frame type is proposed for overcoming this disadvantage. This stirrer comprises one or more frames fixed coaxially to a single rotatable shaft passing axially through the autoclave, the periphery of the frame, forming a blade which, when the stirrer is rotating, moves in close proximity to the internal surface of the autoclave.

Nevertheless, when using stirrers of the "ribbon blender" or "frame" type, formation of crusts on the surface of the stirrer shaft is observed during polymerization. The shaft of the stirrer also has the following disadvantages:

It contributes, to only a slight extent, to the inertia and therefore the rigidity of the stirrer, while considerably increasing its volume. The rigidity of a stirrer does in fact increase with its inertia, and to obtain a given inertia, more and more material is required, the closer this material is situated to the axis of rotation.

It does not, in practice, contribute at all to the stirring or agitation of the reaction medium.

It makes only a small contribution to heat exchange between the stirrer and the reaction medium for two reasons; firstly, for a given flow rate of heat exchange fluid within the stirrer, the speed of flow of fluid inside the shaft is relatively slow; secondly and chiefly, because of the slow movement of the reaction medium in the vicinity of the autoclave axis.

It prevents introduction of ingredients along the autoclave axis. The ingredients can be introduced only through an opening formed in the wall of the autoclave. The passage of the stirrer blades past the opening, on each revolution of the stirrer, has a disadvantageous effect upon the distribution of the ingredients and can lead to the formation of deposits.

It is an object of this invention to provide a means and method for bulk polymerization of monomers which produce polymers insoluble in the monomers in a manner which overcomes the heat exchange and temperature control problems previously described and provides for an improved production of polymers of more uniform particle size.

SUMMARY OF THE INVENTION

These and other objects and advantages of this invention will hereinafter appear, and for purposes of illustration, but not of limitation, an embodiment of the reactor of this invention is illustrated in the accompanying drawing, in which

DESCRIPTION OF THE PREFERRED EMBODIMENT OF THE INVENTION

Figure 1:
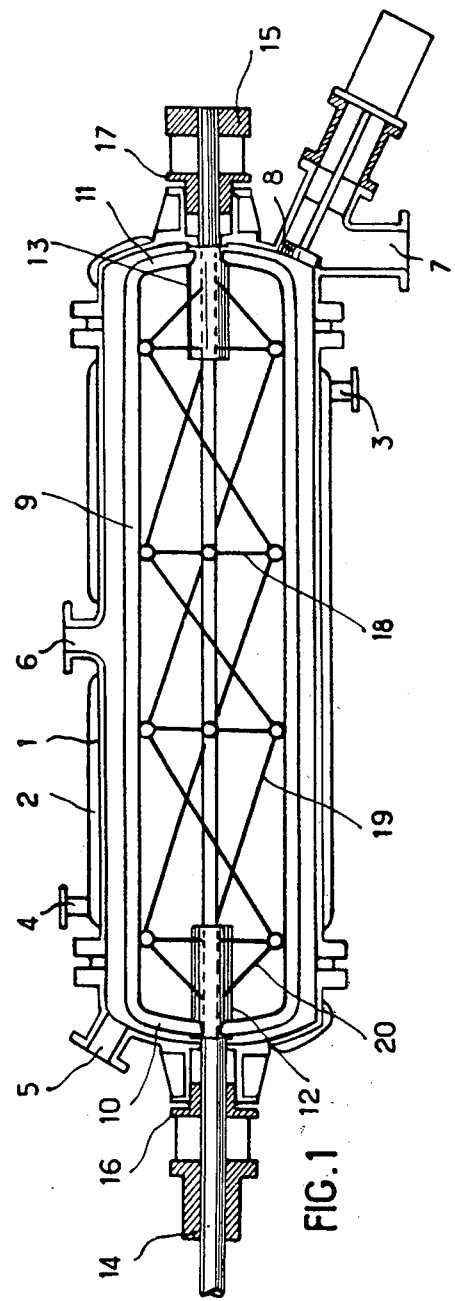
FIG. 1 is a longitudinal axial section of one embodiment of an autoclave rigidly mounted with its axis substantially horizontal and provided with stirring means.

According to the present invention, a process for the bulk polymerization of monomers, which produce polymers insoluble in the monomers from which they are derived, comprises carrying out the polymerization in an autoclave rigidly mounted with its axis substantially horizontal and provided with stirring means comprising at least two half-frames arranged symmetrically of the axis of the autoclave and fixed at each end to a rotatable stub shaft extending axially of the autoclave, each half-frame having a peripheral member serving as a blade which, on rotation of the half-frames about the axis of the autoclave, passes in close proximity to the interior surface of the autoclave, the peripheral members of the half-frames being interconnected by bracing means.

I have found that, when polymerization is carried out using an autoclave such as that just described, there is a complete absence of crusts on the surface of the stirrer at the end of the polymerization.

The autoclave may have a capacity larger than 35m$^3$. Such large autoclaves were heretofore incapable of being provided with stirring means comprising a rotatable shaft passing through the autoclave because of the appreciable bending to which the shaft is subjected.

Advantageously, stub shafts, peripheral members and bracing means are hollow and permit the passage of a heat exchange fluid therethrough.

The stirring means may comprise several half-frames, their number being unrestricted, fixed to the stub shafts in such a way as to achieve, mechanically, the best operating conditions, i.e., the half-frames are arranged equi-angularly around the common axis of the stub shafts. Thus, when there are four half-frames, they are arranged at 90° to each other and when there are three half-frames they are arranged at 120° to each other.

Preferably, therefore, the stirring means comprises a plurality of half-frames equi-angularly arranged around the axis of the autoclave and bracing means comprising first sets of bracing members, each bracing member of each set being secured at its ends to adjacent peripheral members so that the bracing members of a set form a polygon in a plane substantially normal to the axis of the autoclave and second sets of bracing members, each bracing member of two of the second sets being secured at one end to a stub shaft and at the other end to a respective one of the apexes of the adjacent first or polygon-forming set. Each bracing member of each remaining second set of bracing members is connected at one end to an apex of a first or polygon-forming set of bracing members and at the other end to the apex of the adjacent first or polygon-forming set on the adjacent peripheral member, taken in sequence about the axis of the autoclave, so that all the first or polygon-forming sets are interconnected.

The stirring means may comprise four half-frames equi-angularly spaced around the axis of the autoclave and first sets of bracing members forming squares in planes substantially normal to the axis of the autoclave.

Alternatively, the stirring means may comprise three half-frames equi-angularly spaced around the axis of the autoclave and first sets of bracing members forming equilateral triangles in planes substantially normal to the axis of the autoclave.

Desirably, the peripheral members are each twisted along their length to form at least part of one complete turn of a helix.

The present process is applicable to the polymerization of any of the derivatives of ethylene which produce polymers insoluble in the monomer or monomers from which they are derived. Such monomers include vinyl chloride, vinylidene chloride, acrylic nitrile and vinyl fluoride. These monomers may be co-polymerized with one another or with other polymerizable monomers, provided that the resulting copolymers are insoluble in the selected mixture of monomers under the polymerizing conditions. The present process is also applicable to the low pressure polymerization of lower olefins, such as ethylene and propylene in the presence of a suitable catalyst.

Referring now to the drawing, FIG. 1 shows an autoclave 1, with its longitudinal axis arranged horizontally, provided with a jacket 2 through which a heat exchange fluid can be circulated. The fluid is introduced through an inlet 3 from a source (not shown) and leaves through an outlet 4. The autoclave 1 has an inlet 5 through which the monomer and other necessary reagents are introduced and an outlet 6 through which the unreacted monomer is removed at the end of the polymerization. The autoclave 1 also has an outlet 7 controlled by a valve 8 through which the polymer is discharged. The monomer inlet 5 and polymer outlet 7 are situated at opposite ends of the autoclave.

The autoclave is provided with stirring means comprising three half-frames arranged at 120° intervals about the longitudinal axis of the autoclave. Each half-frame comprises a peripheral member 9 fixed at its ends 10 and 11 to respective stub shafts 12, 13 arranged axially of the autoclave and mounted for rotation in bearings 14 and 15, respectively. Sealing of the stub shaft 12 into the end of the autoclave is effected by a stuffing box 16 and sealing of the stub shaft 13 by a stuffing box 17. The peripheral members 9 serve as blades and are arranged so that, when the stirring means is driven through the stub shaft 12, they pass in close proximity to the interior surface of the autoclave. The peripheral members 9 are connected to one another by bracing members 18 and 19 and to the stub shafts 12, 13 by bracing members 20. There are four sets of three bracing members 18 and, in each set, each bracing member 18 is connected at its ends to adjacent peripheral members 9 to form an equilateral triangle in a plane normal to the axis of the autoclave 1. Three sets of three bracing members 19 interconnect the triangle-forming sets 18, each bracing member 19 of each set being connected at one end to an apex of one of the triangle-forming sets and at the other end to the apex of the adjacent triangle-forming set on the adjacent peripheral member 9, taken in sequence about the axis of the autoclave. Each of two sets of three bracing members 20 connect the stub shafts 12, 13 to their adjacent triangle-forming set.

Figure 2:
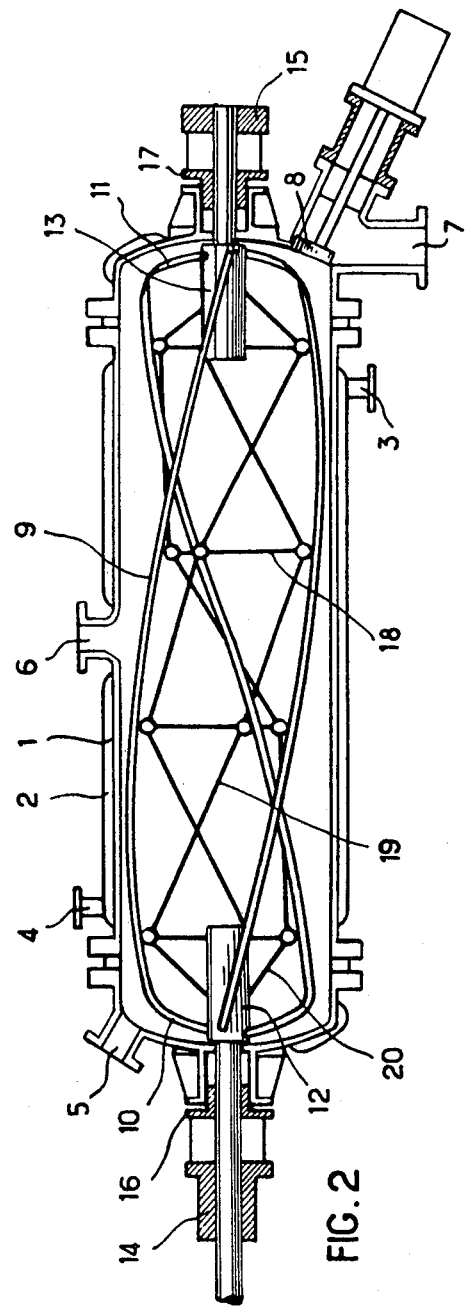
FIG. 2 is a longitudinal axial section of another embodiment of an autoclave rigidly mounted with its axis substantially horizontal and provided with stirring means.

The embodiment of the autoclave shown in FIG. 2 is generally similar to that just described and the same reference numerals have been used to designate the same or like parts. This embodiment differs from that of FIG. 1 in that the peripheral members 9 are each twisted along their lengths to form at least part of one complete turn of a helix.

Preferably, in both embodiments, the stub shafts 12, 13, the peripheral members 9 and the bracing members 18, 19 and 20 are hollow to permit the passage of a heat exchange fluid therethrough. The autoclave, provided with stirring means embodying the features of this invention, has the following advantages, when used for the bulk polymerization of vinyl chloride;

A relatively moderate volume is occupied by the stirring means for a given inertia, that is for a given rigidity.

Gives improved stirring or agitation of the reaction medium due to the inclination of bracing members with respect to the autoclave axis, these bracing members ensuring lateral displacement of the reaction medium and product.

Improves heat exchanges between the stirring means, particularly when a fluid is passed through it, and the reaction medium, because bracing members move in a peripheral zone of the autoclave where the displacement speed of the reaction medium is high. This permits rapid heating up of the autoclave at the beginning of polymerization and improved degassing of the polymer at the end of polymerization.

Permits the introduction of all ingredients along the autoclave axis.

Enables the autoclave to be cleaned by means of a jet of water issuing at very high pressure from a nozzle, preferably a rotatable nozzle, because it is possible to introduce the nozzle along the autoclave axis. By rotating the stirring means during cleaning by this means, it is possible to carry out complete cleaning of the autoclave and stirring means, no area being protected for any appreciable period from the water jet.

The following examples illustrate the application of the present process to the bulk polymerization of vinyl chloride, using an autoclave such as that just described.

EXAMPLE 1

This example is given for purposes of comparison.

220 kg of monomeric vinyl chloride and 32 g of azodiisobutyronitrile were introduced into a stainless steel autoclave of 500 liters capacity having a jacket and a stirrer of the "frame" type, such as that described in French Pat. No. 1,360,251.

The stirrer was hollow and means were provided for a flow of water at a regulated temperature through it.

The stirrer speed was set at 30 r.p.m.

The autoclave was purged by degassing 20 kg of vinyl chloride and the temperature of the reaction medium was raised by circulating water at 70° C. through the jacket and the stirrer. 45 minutes were necessary to raise the reaction medium to a temperature of 62° C. which corresponded to a relative pressure of 9.3 bars in the autoclave.

After 18 hours of polymerization, the unreated monomer was degassed. To carry out this degassing which, because of volatilization of the vinyl chloride, leads to cooling of the medium, it was necessary to introduce heat into the medium by circulating water through the jacket and the stirrer. This water was maintained at a temperature not exceeding 65° C., since a higher temperature may have been prejudicial to the quality of the product. When the pressure in the autoclave had fallen to less than 3 bars, degassing was continued by means of a compressor, then by means of a vacuum pump, until a vacuum at a pressure of 600 mm of mercury was reached and maintained.

Taking the commencement of degassing as the starting time:

The pressure of 3 bars was reached in 20 minutes.

The pressure of 600 mm of mercury was reached in 40 minutes.

The pressure of 600 mm of mercury was maintained for 30 minutes.

After the vacuum had been relieved by the introduction of nitrogen and re-established in 10 minutes at a pressure of 600 mm of mercury, the vacuum was again relieved by the introduction of nitrogen. The autoclave was then emptied. With a yield of 76% relative to the monomer, a pulverulent polyvinyl chloride was obtained having an AFNOR viscosity index of 95, determined in accordance with the standard NFT 51013, and having a volatile materials content, determined by loss of weight on heating for 2 hours at 110° C., of 0.2%.

EXAMPLE 2

Polymerization was carried out as described in Example 1, but using an autoclave provided with stirring means such as that described with reference to FIG. 1. The stirrer means was formed of hollow members and means were provided for circulating water at a selected temperature through those members.

It was found that only 35 minutes were required to raise the reaction medium to the temperature of 62° C., which represents a relative pressure of 9.3 bars in the autoclave.

At the end of the polymerization there was recovered, with a yield of 77% relative to the monomer, a pulverulent polyvinyl chloride having an AFNOR viscosity index of 95, determined in accordance with standard NFT 51013, and having a volatile materials content, determined by loss of weight on heating for 2 hours at 110° C., of 0.17%.

EXAMPLE 3

For comparison purposes, this example describes carrying out bulk polymerization of vinyl chloride in two stages, a prepolymerization stage and final polymerization stage.

The installation used comprised a stainless steel vertical prepolymerizer of 200 liters capacity, fitted with a turbine stirrer, known industrially as a "Typhon" stirrer, of 180 mm diameter, and a polymerizer constituted by an autoclave having a "frame" type stirrer such as that used in Example 1.

The speed of rotation of the stirrer of the prepolymerizer was set at 710 r.p.m.

100 kg of monomeric vinyl chloride was introduced into the prepolymerizer, which was then purged by degassing 10 kg of the vinyl chloride. 18 g of azodiisobutyronitrile was also introduced.

The temperature of the reaction medium was raised rapidly to 62° C., which corresponded to a relative pressure of 9.3 bars in the prepolymerizer.

After 3 hours prepolymerization, the monomer-prepolymer mixture was transferred into the polymerizer, which had previously been charged with 100 kg of vinyl chloride and 18 g of azodiisobutyronitrile and purged by degassing 10 kg of the vinyl chloride. The rotational speed of the stirrer in the polymerizer was set at 30 r.p.m.

The temperature of the reaction medium was raised by circulating water at 70° C., through the jacket and the stirrer. 35 minutes were required to raise the reaction medium to 62° C., which corresponded to a relative pressure of 9.3 bars in the polymerizer.

After 12 hours polymerization, the unreacted monomer was degassed as described in Example 1. With a yield of 64.6% relative to the monomer, a pulverulent polyvinyl chloride was recovered having an AFNOR viscosity index of 95, determined in accordance with standard NFT 51013, and having a volatile materials content, determined by loss of weight on heating for 2 hours at 110° C., of 0.27%.

EXAMPLE 4

Polymerization was carried out as described in Example 3, but using, as the polymerizer, an autoclave provided with stirring means as described in Example 2.

It was found that only 20 minutes were required to raise the reaction medium in the polymerizer to the temperature of 62° C., which corresponded to a relative pressure of 9.3 bars.

With a yield of 66% relative to the monomer, a pulverulent polyvinyl chloride was recovered having an AFNOR viscosity index of 95, determined in accordance with standard NFT 51013, and having a volatile materials content, determined by loss of weight on heating for 2 hours at 110° C., of 0.1%.

Starting from each of the polymer resins obtained in Examples 3 and 4, a mixture was prepared having the following composition in parts by weight;

| | |
|---|---|
| Resin | 100 |
| Epoxided soya oil | 3 |
| Alpha phenyl indole | 1 |
| Calcium stearate | 0.5 |
| Montan wax esterified by glycerine | 0.5 |

Each of the mixtures obtained was used to produce a tube of 0.2 mm thickness by extrusion-blowing at 185° C., using a single screw extruder.

Transparency examination of the tubes obtained showed that the tube made from the resin produced in Example 4 contained half as many unmelted particles or "fisheyes", as that made from the resin produced in Example 3. This indicates that the stirring in the polymerizer used in Example 4 leads to a more homogeneous product than the stirring in the polymerizer used in Example 3.

It will be understood that changes may be made in the details of construction, arrangement and operation, without departing from the spirit of the invention, especially as defined in the following claims.

I claim:

1. In a process for bulk polymerization of a monomeric composition based on vinyl chloride which produces a polymer insoluble in the monomer whereby the reaction medium converts from a liquid phase to a solid powdered phase during the polymerization reaction, conducting the final polymerization wherein the polymerizable material converts from a liquid phase to a solid powdered phase in a horizontally disposed autoclave of cylindrical shape having stub shafts mounted for rotational movement along the axis of the autoclave, with the ends thereof extending a short distance into the autoclave, mixing the polymerizable material during final polymerization in the autoclave by engaging the material with equally circumferentially spaced apart half frame members which extend substantially throughout the length of the autoclave and are connected at their opposite ends to the stub shafts for rotational movement therewith about a cylindrical path adjacent the cylindrical walls of the autoclave, engaging the material with axially spaced sets of first bracing members which extend between adjacent half frame members in a plane normal to the axis of the autoclave whereby such bracing members are disposed in the outer peripheral zones of the autoclave, engaging the material with second bracing members which extend angularly in sequence from the end portions of each first bracing member adjacent its point of connection to a frame member to the end portions of first bracing members of adjacent sets at their points of connection with adjacent frame members, whereby said first and second bracing members are disposed in outer peripheral zones of the autoclave where the displacement speed of the polymerizable material is high and whereby the area defined by the central axial portion of the autoclave between the stub shafts is substantially free of any axial shaft or other members having little movement relative to the material.

2. A process as claimed in claim 1 in which the material is engaged by more than two equidistantly circumferentially spaced half frame members whereby the first and second bracing members are confined to outer peripheral zones of the autoclave where the displacement speed of the reaction medium is high.

3. A process as claimed in claim 1 in which the material is engaged by three equidistantly circumferentially spaced half frame members whereby the first bracing members in each set defines an equilateral triangle in a plane normal to the axis of the autoclave.

4. A process as claimed in claim 1, wherein the frame members are each twisted along their length to form at least part of one complete turn of a helix.

5. A process as claimed in claim 1, wherein the stub shafts, the frame members and the bracing members are hollow and circulating a heat exchange fluid therethrough.

* * * * *